Dec. 28, 1937. A. M. BACH 2,103,838

HOSE COUPLING

Filed Aug. 30, 1937

INVENTOR:
ANTON MARINUS BACH,
BY: Christian R. Nielsen
ATTORNEY.

Patented Dec. 28, 1937

2,103,838

UNITED STATES PATENT OFFICE 2,103,838

HOSE COUPLING

Anton Marinus Bach, Palo Alto, Calif.

Application August 30, 1937, Serial No. 161,666

6 Claims. (Cl. 285—71)

This invention relates to a hose coupling and more particularly to a type wherein the internal pressure within the hose effects positive sealing connection with a fitting, and it consists in the constructions, arrangements and combinations herein described and claimed.

It is the object of the invention to provide a coupling of few parts and extreme simplicity from the standpoint of manufacture as well as installation.

It is also an object of the invention to provide a coupling which is automatic in its action both in attachment and detachment from a fitting.

Additional objects, advantages and features of invention will be apparent from the following description considered in conjunction with the accompanying drawing, wherein Figure 1 is an elevational view of a faucet having my coupling installed.

Figure 1:
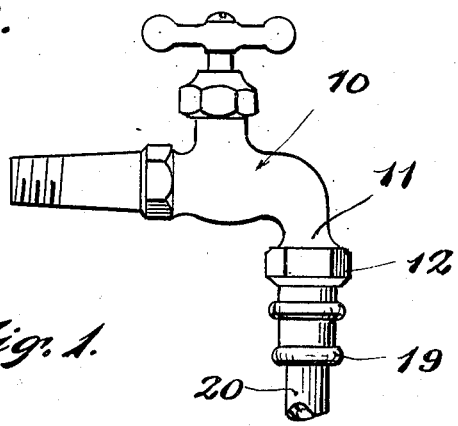

There is illustrated in Figure 1, a faucet 10 embodying a threaded outlet fitting 11 as is customary, upon which there is engaged a fitting 12.

The fitting 12 may be formed from any suitable material and in the present instance of use, would be formed of duraluminum, brass or the like.

Inwardly of the threaded portion 13 of the fitting, there is formed an inwardly directed circumferential flange 14, providing an aperture 15, the inner wall of which is tapered in the direction of flow of fluid through the fitting. The wall defining the aperture 15 is of a length greater than the thickness of the metal of the flange, providing a frusto-conical collar 16. The outer face of the collar has formed at the end thereof an annular seat 17 for a purpose presently to be explained.

The fitting 12 has formed intermediate its length, upon the interior surface, an annular recess 18, the side walls of the recess being tapered in the direction of the collar 16 and at the end of the fitting opposite the threaded portion 13 a round, annular recess 19 is formed.

The hose for use with the rubber fitting will now be described, and may be formed by any of the well known methods now employed.

Figure 5:
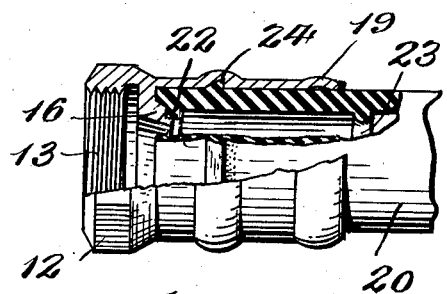
Figure 5 is a similar view of the parts engaged.

The rubber fitting 20 is of a diameter to freely fit within the fitting 12, the forward end being tapered as at 21 to engage a corresponding surface on the collar 16, and inwardly of the tapered portion an annular flange 22 is formed of a diameter so as to seat within the recess 17 when fully engaged within the fitting and as shown in Figure 5. The rubber fitting also has formed upon its inner surface an annular rib 23, located so as to occupy a position slightly outward of the fitting 12 when the rubber fitting and hose is fully engaged.

Upon the exterior surface of the rubber fitting a circumscribing angular shaped shoulder 24 is formed, being spaced from the end of the rubber fitting so as to occupy the annular recess 18, when in its operative position.

Figure 4:
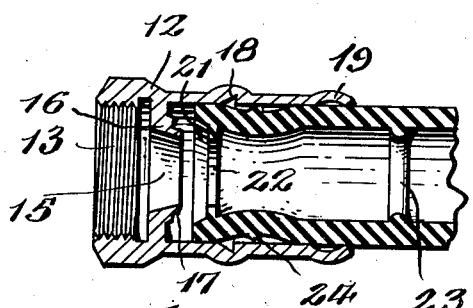
Figure 4 is a longitudinal sectional view through the end coupling and the rubber fitting in partly engaged relation.

In use, the fitting 12 will be permanently secured to the faucet, and when the hose is to be connected thereto, the end of the rubber fitting bearing the angular shoulder 24 is presented into the open end of the fitting 12 as is indicated in Figure 4. Continued inward movement of the rubber fitting in the hose will bring the shoulder into engagement with the annular recess 18 and in this position of the hose the tapered portion 21 will seat upon the collar 16, and the annular flange 22 will be engaged with the recess. When the water is admitted into the fitting the pressure of the water will cause the rubber fitting to expand, forcing the shoulder 24 into firm engagement with its seat and due to back pressure developed by the annular rib 23, the rubber fitting body will further expand at the point of the annular recess 19. It will thus be seen that the rubber fitting will be firmly retained in the fitting without liability of leakage, and in order that the hose may be removed, it is only necessary to shut off the water, thereby reducing the pressure within the hose, when it may be withdrawn.

Figure 2:
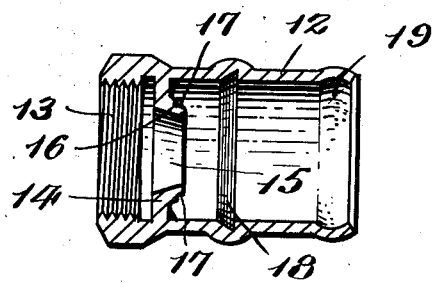
Figure 2 is a longitudinal sectional view through the metallic coupling member.
Figure 3:
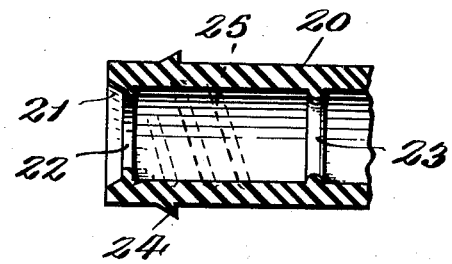
Figure 3 is a longitudinal sectional view through the rubber fitting.

If desired, the interior of the rubber fitting may be provided with a series of internal threads 25, as indicated in dotted lines in Figure 3.

While I have shown and described a preferred construction, this is by way of illustration only, and I consider as my own all such modifications in structure as fairly fall within the scope of the appended claims.

I claim:—

1. A hose coupling comprising in combination, a metallic fitting having an internal tapered collar, an internal annular recess in advance of the collar, an expansible rubber fitting of a diameter to loosely fit within the fitting and having an end complemental to the collar, a shoulder on the exterior of the rubber fitting for seating engagement within the annular recess of the fitting, and said fitting having an annular recess adjacent its end whereby to permit expansion of a portion of the hose thereinto.

2. A hose coupling comprising in combination, a metallic fitting having an internal tapered collar, an internal annular angularly shaped recess in advance of the collar, an expansible hose of a diameter to loosely fit within the fitting and having an end complemental to the collar, an angularly shaped circumscribing shoulder on the exterior of the rubber fitting for seating engagement within the annular recess of the fitting and said fitting having an annular recess whereby to permit expansion of a portion of the hose thereinto.

3. The structure of claim 2 in which the rubber fitting has an annular rib upon its interior positioned in advance of the end of the fitting.

4. A hose coupling comprising in combination, a metallic fitting having an internal tapered collar, said collar having an annular recess in the end thereof, an internal annular angularly shaped recess in advance of the collar, an expansible hose of a diameter to loosely fit within the fitting, an end of the hose having a tapered opening complemental to the taper of the shoulder, an annular flange at the base of the taper of the opening of a diameter to fit the recess of the shoulder, an angularly shaped circumscribing shoulder on the exterior of the rubber fitting for seating engagement within angularly shaped recess of the fitting and said fitting having an annular recess whereby to permit expansion of a portion of the hose thereinto.

5. A hose coupling comprising in combination, a metallic fitting having an internal tapered collar, said collar having an annular recess in the end thereof, an internal annular angularly shaped recess in advance of the collar, an expansible rubber fitting of a diameter to loosely fit within the fitting, an end of the hose having a tapered opening complemental to the taper of the shoulder, an annular flange at the base of the taper of the opening of a diameter to fit the recess of the shoulder, an angularly shaped circumscribing shoulder on the exterior of the rubber fitting for seating engagement within the angularly shaped recess of the fitting, said fitting having an annular recess whereby to permit expansion of a portion of the rubber fitting thereinto, and said rubber fitting having an internal restricted area in advance of the termination of the fitting.

6. A hose coupling comprising in combination, a metallic fitting having means for connection with a source of water supply, said fitting having an internal tapered collar, said collar having an annular recess in the end thereof, an internal annular angularly shaped recess in advance of the collar, an expansible rubber fitting of a diameter to loosely fit within the fitting, an end of the rubber fitting having a tapered opening complemental to the taper of the shoulder, an annular flange at the base of the taper of the opening of a diameter to fit the recess of the shoulder, an angularly shaped circumscribing shoulder on the exterior of the hose for seating engagement within angularly shaped recess of the fitting, said fitting having an annular recess whereby to permit expansion of a portion of the rubber fitting thereinto, and said hose having an internal rib in advance of the termination of the fitting.

ANTON M. BACH.